United States Patent
Mahato et al.

(10) Patent No.: US 12,417,484 B2
(45) Date of Patent: Sep. 16, 2025

(54) SYSTEM AND COMPUTER-IMPLEMENTED METHOD FOR FULFILLING AN ORDER REQUEST

(71) Applicant: Visa International Service Association, San Francisco, CA (US)

(72) Inventors: Kaushik Kumar Mahato, Jharkhand (IN); Maninder Singh Puhi, Karnataka (IN); Shailja Dalmia, Bihar (IN); Som Madhab Bhattacharya, Karnataka (IN)

(73) Assignee: Visa International Service Association, San Francisco, CA (US)

( * ) Notice: Subject to any disclaimer, the term of this patent is extended or adjusted under 35 U.S.C. 154(b) by 85 days.

(21) Appl. No.: 17/788,789

(22) PCT Filed: Dec. 27, 2019

(86) PCT No.: PCT/US2019/068697
§ 371 (c)(1),
(2) Date: Jun. 24, 2022

(87) PCT Pub. No.: WO2021/133409
PCT Pub. Date: Jul. 1, 2021

(65) Prior Publication Data
US 2023/0035465 A1    Feb. 2, 2023

(51) Int. Cl.
*G06Q 30/00* (2023.01)
*G06Q 30/0601* (2023.01)

(52) U.S. Cl.
CPC ................. *G06Q 30/0635* (2013.01)

(58) Field of Classification Search
CPC .................................. G06Q 30/0635
See application file for complete search history.

(56) References Cited

U.S. PATENT DOCUMENTS

| | | |
|---|---|---|
| 2002/0103663 A1 | 8/2002 | Bankier et al. |
| 2004/0068501 A1* | 4/2004 | McGoveran ........ G06F 11/1474 714/E11.131 |

(Continued)

FOREIGN PATENT DOCUMENTS

EP    1326192 A1    7/2003

OTHER PUBLICATIONS

Daigle, Ronald J., and James C. Lampe. "The impact of the risk of consequence on the relative demand for continuous online assurance." International Journal of Accounting Information Systems 5.3 (2004): 313-340.*

*Primary Examiner* — Kathleen Palavecino
(74) *Attorney, Agent, or Firm* — The Webb Law Firm

(57) ABSTRACT

The present disclosure relates to a system and computer-implemented method for fulfilling an order request. The method includes receiving information regarding a transaction between a user and a merchant, and information regarding an error while processing the transaction. Further, based on a received assurance value from the merchant, requesting one or more entities for providing at least one of a partial or total of the assurance value. Furthermore, in response to the request, a contribution value is received from each of the one or more entities, where the contribution value is one of the partial or total of the assurance value. Finally, an assurance message is provided to the merchant indicating successful payment for fulfilling the order request of the user upon determining the contribution value received from the one or more entities is summing up to the assurance value.

14 Claims, 7 Drawing Sheets

(56) References Cited

U.S. PATENT DOCUMENTS

| | | |
|---|---|---|
| 2012/0158654 A1 | 6/2012 | von Behren et al. |
| 2014/0162598 A1 | 6/2014 | Villa-Real |
| 2015/0178725 A1* | 6/2015 | Poetsch .............. G06Q 20/3572 |
| | | 705/44 |
| 2017/0249637 A1 | 8/2017 | Tribak Lyedri et al. |
| 2017/0345069 A1 | 11/2017 | Labrie et al. |
| 2018/0005323 A1* | 1/2018 | Grassadonia .......... G06Q 40/02 |
| 2018/0137514 A1* | 5/2018 | Wiesman ................ G06Q 20/34 |
| 2023/0115345 A1* | 4/2023 | Grassadonia .......... G06Q 40/00 |
| | | 705/44 |

* cited by examiner

SYSTEM AND COMPUTER-IMPLEMENTED METHOD FOR FULFILLING AN ORDER REQUEST

CROSS-REFERENCE TO RELATED APPLICATION

This application is the United States national phase of International Application No. PCT/US2019/068697 filed Dec. 27, 2019, the entire disclosure of which is hereby incorporated by reference in its entirety.

BACKGROUND

1. Technical Field

The present disclosure relates to order management. Particularly, but not exclusively, the present disclosure relates to a system and method for fulfilling an order request.

2. Technical Considerations

Generally, order fulfillment is a process in an online/offline platform involving a service request and/or one or more commodities requests from a merchant by a user, followed by initiating a payment transaction by the merchant based on the details provided by the user. Thereafter, the service request and/or the one or more commodities request are processed and delivered by the merchant to the user. The payment transaction initiated by the merchant may include a card present transaction, card on file transaction, Unified Payment Method (UPI), and the like. The payment transaction initiated by the merchant may be completed by an issuer server associated with an issuer bank immediately or may require an additional time, for example, one to two days, to complete the transaction. The transaction is complete when an acquirer server associated with the acquirer bank receives the payment from the issuer server. Generally, the issuer server is associated with the user and the acquirer bank is associated with the merchant. In some cases, the issuer server and the acquirer bank may be the same.

Upon requiring additional time to complete the payment transaction, the merchant may be reluctant to process and deliver the order request placed by the user. Generally, it is very unlikely that a merchant will fulfill an order which is not completed immediately and may require more time for completion. Such scenarios may force the user to either make a new transaction or make a new purchase of the commodity. Thus, the existing techniques do not provide a method, in such scenario, to complete the payment transaction initiated by the merchant, for fulfilling the order request of the user. This may lead to trust issues between the merchant and the user, and eventually affects customer satisfaction and retention.

The information disclosed in this background of the disclosure section is only for enhancement of understanding of the general background of the disclosure and should not be taken as an acknowledgement or any form of suggestion that this information forms the existing art already known to a person skilled in the art.

SUMMARY

Additional features and advantages are realized through the techniques of the present disclosure. Other embodiments and aspects of the disclosure are described in detail herein and are considered a part of the claimed disclosure.

In some non-limiting embodiments or aspects, provided is a computer-implemented method comprising: receiving, with at least one processor, information regarding a transaction between a user and a merchant, and information regarding an error that occurred while processing the transaction; receiving, with at least one processor, an assurance value indicating a portion of a total amount associated with the transaction from the merchant for fulfilling an order request of the user, wherein the merchant communicates the assurance value to the assurance server upon learning about the error that occurred while processing the transaction; requesting, with at least one processor, one or more entities for providing at least one of a partial or total of the assurance value received from the merchant; in response to the request, receiving, with at least one processor, a contribution value from each of the one or more entities, wherein the contribution value is one of the partial or total of the assurance value; and in response to determining the contribution value received from the one or more entities is summing up to the assurance value, communicating, with at least one processor, an assurance message to the merchant indicating successful payment for fulfilling the order request of the user.

In some non-limiting embodiments or aspects, the error that occurred while processing the transaction comprises at least one of the following: a message failure, a hardware failure, a network failure, or any combination thereof. In some non-limiting embodiments or aspects, the one or more entities comprise at least one of a financial institution and an individual person. In some non-limiting embodiments or aspects, the response to the request from the one or more entities is received within a first predefined time period. In some non-limiting embodiments or aspects, the response to the request from the one or more entities after a first predefined time period is rejected. In some non-limiting embodiments or aspects, the order request of the user is declined upon determining that the contribution value received from the one or more entities is not equal to the assurance value. In some non-limiting embodiments or aspects, the at least one processor, the merchant, and the one or more entities are connected via a communication network. In some non-limiting embodiments or aspects, the contribution value from each of the one or more entities is determined using a risk level obtained from one or more parameters associated with at least one of the following: the user, the merchant, the order request, or any combination thereof. In some non-limiting embodiments or aspects, the one or more parameters comprises at least one of the following: user information, a Bank Identification Number (BIN), transaction log information, merchant information, details of the order request, past transactions of the user, past transactions of the merchant, or any combination thereof.

In some non-limiting embodiments or aspects, provided is an assurance server, comprising: at least one processor; and a memory communicatively coupled to the at least one processor, wherein the memory stores processor instructions, which, on execution, causes the at least one processor to: receive information regarding a transaction between a user and a merchant, and information regarding an error that occurred while processing the transaction; receive an assurance value indicating a portion of a total amount associated with the transaction from the merchant for fulfilling an order request of the user, wherein the merchant communicates the assurance value to the assurance server upon learning about the error that occurred while processing the transaction; request one or more entities for providing at least one of a partial or total of the assurance value received from the merchant; in response to the request, receive a contribution value from each of the one or more entities, wherein the contribution value is one of the partial or total of the assurance value; and in response to upon determining a total contribution value received from the one or more entities is summing up to the assurance value, communicate an assurance message to the merchant indicating successful payment for fulfilling the order request of the user.

In some non-limiting embodiments or aspects, the error that occurred while processing the transaction comprises at least one of the following: a message failure, a hardware failure, a network failure, or any combination thereof. In some non-limiting embodiments or aspects, the one or more entities comprise at least one of a financial institution and an individual person. In some non-limiting embodiments or aspects, the at least one processor is configured to receive the response to the request from the one or more entities within a first predefined time period. In some non-limiting embodiments or aspects, the at least one processor is configured to reject the response to the request from the one or more entities after a first predefined time period. In some non-limiting embodiments or aspects, the at least one processor is configured to send a message to the merchant indicating the contribution value received from the one or more entities is not equal to the assurance value to cause the merchant to decline the order request of the user. In some non-limiting embodiments or aspects, the contribution value from each of the one or more entities is determined using a risk level obtained from one or more parameters associated with at least one of the following: the user, the merchant, the order request, or any combination thereof.

In some non-limiting embodiments or aspects, provided is a computer-implemented method comprising: re-initiating, with at least one processor, a transaction between a user and a merchant after receiving information regarding the transaction when an error occurred while processing the transaction and an assurance server fulfilled an order associated with the transaction; in response to receiving a success message: receiving or determining, with at least one processor, a total amount associated with the transaction between the user and the merchant; and distributing, with at least one processor, a contribution value and a supplementary value based on the contribution value to each of the one or more entities from the total amount, wherein the contribution value of the one or more entities is at least one of a partial or total of an assurance value, wherein the assurance value is a portion of the total amount associated with the transaction; and in response to receiving a failure message, performing, with at least one processor, at least one of re-initiating the transaction between the user and the merchant after a second predefined time period, and discarding the transaction.

In some non-limiting embodiments or aspects, the re-initiated transaction is discarded after initiating the transaction for a predefined value and receiving the failure message. In some non-limiting embodiments or aspects, re-initiating the transaction comprises inserting, with at least one processor, a value in one or more fields in a transaction message of the re-initiated transaction, indicating a re-initiation of the transaction after the second predefined time period, wherein the re-initiated transaction failed due to the error that occurred while processing the transaction. In some non-limiting embodiments or aspects, the one or more fields in the transaction message comprise at least one of the following: a Message Type Indicator (MTI), a bitmap, data elements, or any combination thereof.

Further non-limiting embodiments or aspects are set forth in the following numbered clauses.

Clause 1. A computer-implemented method comprising: receiving, with at least one processor, information regarding a transaction between a user and a merchant, and information regarding an error that occurred while processing the transaction; receiving, with at least one processor, an assurance value indicating a portion of a total amount associated with the transaction from the merchant for fulfilling an order request of the user, wherein the merchant communicates the assurance value to an assurance server upon learning about the error that occurred while processing the transaction; requesting, with at least one processor, one or more entities for providing at least one of a partial or total of the assurance value received from the merchant; in response to the request, receiving, with at least one processor, a contribution value from each of the one or more entities, wherein the contribution value is one of the partial or total of the assurance value; and in response to determining the contribution value received from the one or more entities is summing up to the assurance value, communicating, with at least one processor, an assurance message to the merchant indicating successful payment for fulfilling the order request of the user.

Clause 2. The method of clause 1, wherein the error that occurred while processing the transaction comprises at least one of the following: a message failure, a hardware failure, a network failure, or any combination thereof.

Clause 3. The method of clause 1 or 2, wherein the one or more entities comprises at least one of a financial institution and an individual person.

Clause 4. The method of any of clauses 1-3, wherein the response to the request from the one or more entities is received within a first predefined time period.

Clause 5. The method of any of clauses 1-4, wherein the response to the request from the one or more entities after a first predefined time period is rejected.

Clause 6. The method of any of clauses 1-5, wherein the order request of the user is declined upon determining that the contribution value received from the one or more entities is not equal to the assurance value.

Clause 7. The method of any of clauses 1-6, wherein the at least one processor, the merchant, and the one or more entities are connected via a communication network.

Clause 8. The method of claim 1, wherein the contribution value from each of the one or more entities is determined using a risk level obtained from one or more parameters associated with at least one of the following: the user, the merchant, the order request, or any combination thereof.

Clause 9. The method of any of clauses 1-8, wherein the one or more parameters comprises at least one of the following: user information, a Bank Identification Number (BIN), transaction log information, merchant information, details of the order request, past transactions of the user, past transactions of the merchant, or any combination thereof.

Clause 10. An assurance server, comprising: at least one processor; and a memory communicatively coupled to the at least one processor, wherein the memory stores processor instructions, which, on execution, causes the at least one processor to: receive information regarding a transaction between a user and a merchant, and information regarding an error that occurred while processing the transaction; receive an assurance value indicating a portion of a total amount associated with the transaction from the merchant for fulfilling an order request of the user, wherein the merchant communicates the assurance value to an assurance server upon learning about the error that occurred while processing the transaction; request one or more entities for providing at least one of a partial or total of the assurance value received from the merchant; in response to the request, receive a contribution value from each of the one or more entities, wherein the contribution value is one of the partial or total of the assurance value; and in response to upon determining a total contribution value received from the one or more entities is summing up to the assurance value, communicate an assurance message to the merchant indicating successful payment for fulfilling the order request of the user.

Clause 11. The assurance server of clause 10, wherein the error that occurred while processing the transaction comprises at least one of the following: a message failure, a hardware failure, a network failure, or any combination thereof.

Clause 12. The assurance server of clause 10 or 11, wherein the one or more entities comprises at least one of a financial institution and an individual person.

Clause 13. The assurance server of any of clauses 10-12, wherein the at least one processor is configured to receive the response to the request from the one or more entities within a first predefined time period.

Clause 14. The assurance server of any of clauses 10-13, wherein the at least one processor is configured to reject the response to the request from the one or more entities after a first predefined time period.

Clause 15. The assurance server of any of clauses 10-14, wherein the at least one processor is configured to send a message to the merchant indicating the contribution value received from the one or more entities is not equal to the assurance value to cause the merchant to decline the order request of the user.

Clause 16. The assurance server of any of clauses 10-15, wherein the contribution value from each of the one or more entities is determined using a risk level obtained from one or more parameters associated with at least one of the following: the user, the merchant, the order request, or any combination thereof.

Clause 17. A computer-implemented method comprising: re-initiating, with at least one processor, a transaction between a user and a merchant after receiving information regarding the transaction when an error occurred while processing the transaction and an assurance server fulfilled an order associated with the transaction; in response to receiving a success message: receiving or determining, with at least one processor, a total amount associated with the transaction between the user and the merchant; and distributing, with at least one processor, a contribution value and a supplementary value based on the contribution value to each of the one or more entities from the total amount, wherein the contribution value of the one or more entities is at least one of a partial or total of an assurance value, wherein the assurance value is a portion of the total amount associated with the transaction; and in response to receiving a failure message, performing, with at least one processor, at least one of re-initiating the transaction between the user and the merchant after a second predefined time period, and discarding the transaction.

Clause 18. The method of clause 17, wherein the re-initiated transaction is discarded after initiating the transaction for a predefined value and receiving the failure message.

Clause 19. The method of clause 17 or 18, wherein re-initiating the transaction comprises inserting, with at least one processor, a value in one or more fields in a transaction message of the re-initiated transaction, indicating a re-initiation of the transaction after the second predefined time period, and wherein the re-initiated transaction failed due to the error that occurred while processing the transaction.

Clause 20. The method of any of clauses 17-19, wherein the one or more fields in the transaction message comprises at least one of the following: a Message Type Indicator (MTI), a bitmap, data elements, or any combination thereof.

In some non-limiting embodiments or aspects, disclosed herein is a computer-implemented method for fulfilling an order request. The method includes receiving information regarding a transaction between a user and a merchant, and information regarding an error that occurred while processing the transaction. Further, the method includes receiving an assurance value indicating a portion of a total amount associated with the transaction from the merchant for fulfilling an order request of the user. The merchant communicates the assurance value to the assurance server upon learning about the error that occurred while processing the transaction. Furthermore, the method includes requesting one or more entities for providing a partial or total of the assurance value received from the merchant. Subsequently, the method includes receiving a contribution value from each of the one or more entities in response to the request, where the contribution value is one of the partial or total of the assurance value. Finally, the method includes communicating or providing an assurance message to the merchant indicating successful payment for fulfilling the order request of the user, upon determining the contribution value received from the one or more entities is summing up to the assurance value.

Further, in some non-limiting embodiments or aspects, the present disclosure may include an assurance server for fulfilling an order request. The assurance server includes a processor and memory communicatively coupled to the processor, where the memory stores the processor executable instructions, which, on execution, causes the processor to receive information regarding a transaction between a user and a merchant, and information regarding an error that occurred while processing the transaction. Further, the processor is configured to receive an assurance value indicating a portion of a total amount associated with the transaction from the merchant for fulfilling an order request of the user, where the merchant communicates the assurance value to the assurance server upon learning about the error that occurred while processing the transaction. Furthermore, the processor is configured to request one or more entities for providing at least one of a partial or total of the assurance value received from the merchant. Subsequently, in response to the request, the processor is configured to receive a contribution value from each of the one or more entities, where the contribution value is one of the partial or total of the assurance value. Finally, the processor is configured to provide the assurance value to the merchant indicating successful payment for fulfilling the order request of the user, upon determining a total contribution value received from the one or more entities is summing up to the assurance value.

Furthermore, in some non-limiting embodiments or aspects, the present disclosure may include a method for re-initiating a failed transaction. The method includes receiving a plurality of details associated with a transaction. Further, the method includes initiating a transaction between a user and a merchant after receiving information regarding the transaction when an error that occurred while processing the transaction and the assurance server fulfilled an order associated with the transaction. Further, the method includes receiving a response for the initiated transaction, where the response comprises at least one of a success or a failure message. Upon receiving a success message, the method includes receiving from the merchant, a total amount associated with the transaction between the user and the merchant. Further, the method includes distributing a contribution value and a supplementary value based on the contribution value to each of the one or more entities from the total amount, where the contribution value of the one or more entities is at least one of a partial or total of assurance value, and where the assurance value is a portion of the total amount associated with the transaction. Upon receiving the failure message, the method includes performing at least one of initiating the transaction between the user and the merchant after a second predefined time period or discard the transaction.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

Figure 1:
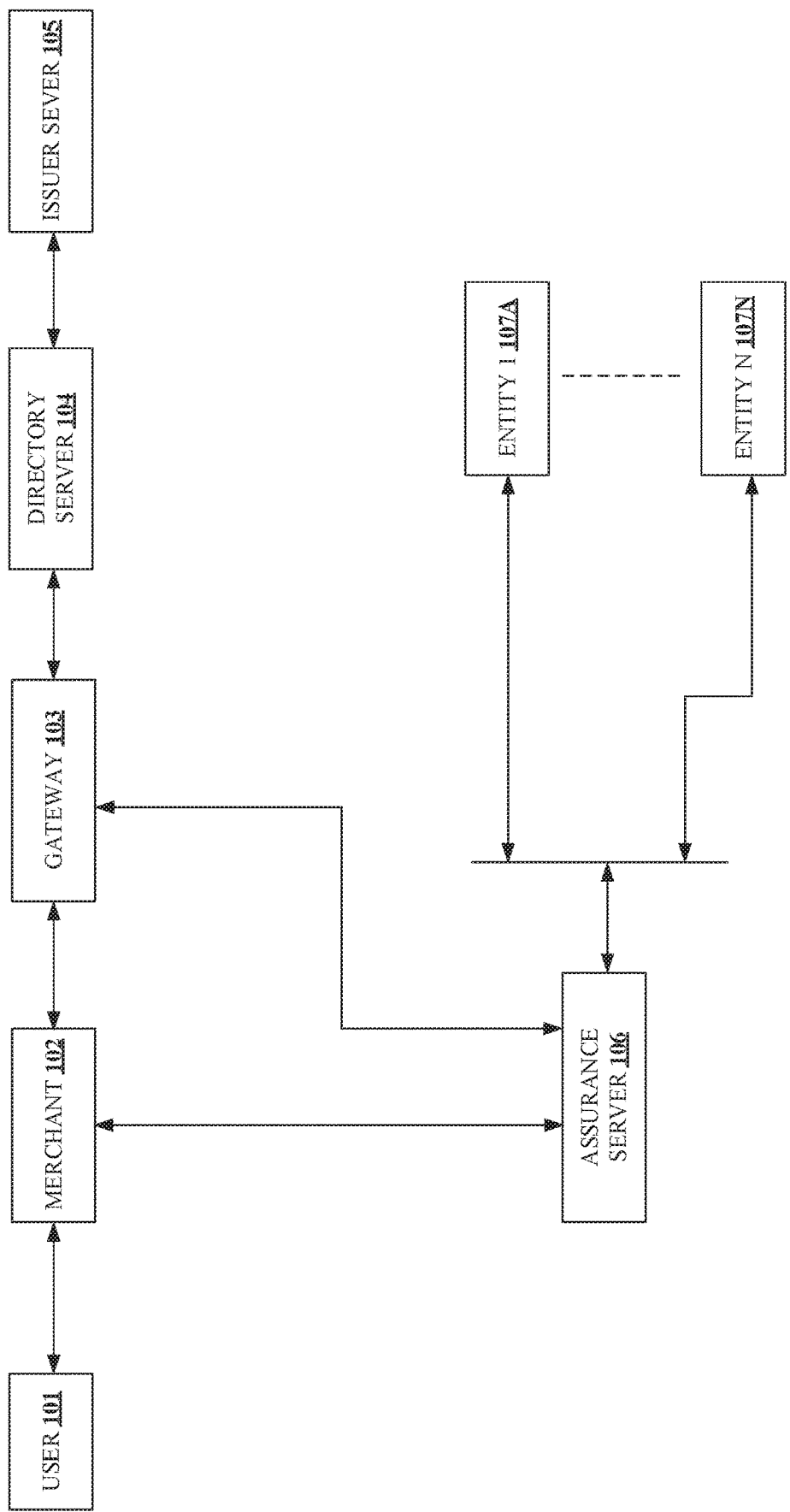
FIG. 1 shows an exemplary environment for fulfilling an order request, in accordance with some non-limiting embodiments or aspects of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer-readable medium and executed by a computer or processor, whether such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

In the following detailed description of the embodiments of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by "comprises . . . a" does not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" does not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The present disclosure relates to a system and computer-implemented method for fulfilling an order request. In some non-limiting embodiments or aspects, the method includes receiving information regarding a transaction between a user and a merchant, and information regarding an error that occurred while processing the transaction. Further, based on a received assurance value from the merchant, requesting one or more entities for providing at least one of a partial or total of the assurance value. Furthermore, in response to the request, a contribution value is received from each of the one or more entities, where the contribution value is one of the partial or total of the assurance value. Finally, an assurance message is provided to the merchant indicating successful payment for fulfilling the order request of the user upon determining the contribution value received from the one or more entities is summing up to the assurance value.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for fulfilling an order request, in accordance with some non-limiting embodiments or aspects of the present disclosure. In some non-limiting embodiments or aspects, a user (101) may initiate a payment transaction with a merchant (102) upon making an order request. The order request made by the user (101) may include at least of purchasing one or more goods from the merchant (102) at a store or through an e-commerce application, requesting a service from the merchant (102) at a store or through an e-commerce application, for example, a cab to drop the user (101) at a destination location, and the like. The payment transaction initiated by the user (101) may include at least one of a card present transaction at a Point-of-Sale (POS) device associated with the merchant (102), card-on-file transaction through a payment application, a payment wallet, and the like.

In some non-limiting embodiments or aspects, the merchant (102) may send an authentication and/or authorization request message associated with a payment transaction between the user (101) and the merchant (102) to the issuer server (105) via a gateway (103) and a directory server (104). The authentication request may include verification of at least one of the following: user credentials, a Bank Identification Number (BIN) of a card associated with the user (101), card verification value of the card, expiry date of the card, merchant authentication, or any combination thereof. The user credentials may include, for example, username, password, pin number, and the like. The authorization request may include a request to approve the payment transaction to the issuer server (105) associated with the user (101). The merchant (102), the gateway (103), the directory server (104), and the issuer server (105) may be connected via at least one of a wired or wireless medium, network, and/or architecture.

In some non-limiting embodiments or aspects, the payment transaction may be successfully completed upon receiving a successful response for the authentication and/or authorization request. Further, the merchant (102) may fulfill the order request of the user (101). The successful authorization of a payment transaction may "freeze" or "hold" a total amount associated with the payment transaction in the user account. The total amount may be transferred to the merchant account (acquirer bank account) from the issuer server (105) during settlement process.

In some non-limiting embodiments or aspects, an error may occur while processing the payment transaction. The error may include, for example, at least one of the following: a message failure, a hardware failure, a network failure, or any combination thereof. The message failure may include an authorization decline for the transaction message, a settlement decline for the transaction message, and the like. For example, the message failure may include transaction limit exceed, phone number required, merchant account configuration error, validation error, and the like. A person skilled in the art will acknowledge that a validation error is different from invalidation of the user credentials. For example, an error may occur due to incomplete KYC details at the issuer server (105) and the like. The hardware failure may include functionality issues with one or more hardware components, for example, routers, network switches, servers, and the like. The network failure may include connectivity issues associated with the merchant (102), the gateway (103), the directory server (104), and the issuer server (105).

In some non-limiting embodiments or aspects, an assurance server (106) may receive information from the merchant (102) regarding the transaction between the user (101) and the merchant (102), and information regarding an error that occurred while processing the transaction. The information regarding the transaction may include one or more of the following: at least one of the user details, for example name, address, phone number and the like, a BIN associated with a card of the user (101), the merchant details, for example name, address, phone number and the like, the merchant category, an acquirer bank (not shown in the figure) details associated with the merchant (102), the issuer server bank details associated with the user (101), the total amount associated with the transaction, an Internet Protocol (IP) address associated with the transaction, and the like. The error associated with the transaction may include at least one of the type of the error (for example, the message failure, the hardware failure, the network failure, and the like) and the error code associated with the error. For example, for an error "capture amount exceeded allowable limit", the associated error code may be "4006". In some non-limiting embodiments or aspects, the transaction message may be provided to the assurance server (106). The transaction message provided to the assurance server (106) may comprise a field indicating the type of error that occurred while processing the transaction message. In some non-limiting embodiments or aspects, the type of error is included in the transaction message by one of the merchant (102), the directory server (104), the gateway (103), and the issuer server (105). The assurance server (106) may store the received transaction information for re-initiating the transaction after a second predefined time period.

Further, the assurance server (106) receives, from the merchant (102), an assurance value indicating a portion of a total amount or a total amount associated with the transaction for fulfilling an order request of the user (101). For example, for a total amount of $100 for an order request, the assurance value may be $80. The assurance value is indicative of a minimum amount the merchant (102) would receive from one or more entities (107A, 107B, . . . , 107N) upon the transaction failing or being declined, by the issuer server (105), upon resubmitting the transaction after the second predefined time period for authentication and/or authorization. For example, the transaction may be declined due to "Transaction Limit Exceeded", the user (101) may request the issuer server (105) to increase the transaction limit and the assurance server (106) may resubmit the transaction after 15 minutes. The assurance server (106) requests the one or more entities (107A, 107B, . . . , 107N) for providing one of a partial or total of the assurance value within a first predefined time period. The first predefined time period indicates the time duration given to each of the one or more entities (107A, 107B, . . . , 107N) for sending the contribution value the assurance server (106). For example, the assurance server (106) may request the one or more entities (107A, 107B, . . . , 107N) to respond within 60 seconds. In response to the request, the assurance server (106) may receive a contribution value from each of the one or more entities (107A, 107B, . . . , 107N) within the first predefined time period, where the contribution value is one of the partial or total of the assurance value. For example, the entity 1 (107A) may provide the contribution value of $50 and the entity N (107N) may provide the contribution value of $30. The assurance server (106) determines a sum of the contribution value received from the one or more entities (107A, 107B, . . . , 107N) and compares the sum of the contribution value with the assurance value. If the sum of the contribution value is equal to the assurance value requested by the assurance server (106), the merchant (102) is provided with an assurance message by the assurance server (106), indicating a successful payment of the assurance value. Finally, the merchant (102) may fulfill the order request of the user (101). Thus, the payment of assurance value when an error occurs in the payment transaction helps to fulfill the order for the user (101) and decrease the rate of cancelling orders for the merchant (102). In some non-limiting embodiments or aspects, the user (101) experience with the merchant (102) is improved by fulfilling the orders even during payment transaction failure. In some non-limiting embodiments or aspects, when the payment transaction is failed, the user (101) may be debited of the transaction amount. In some non-limiting embodiments or aspects, when the re-initiation of the payment transaction fails repeatedly, the transaction amount may be credited back to the user (101) In some non-limiting embodiments or aspects, the assurance server (106), upon determining the contribution value received from the one or more entities (107A, 107B, . . . , 107N) is not equal to the assurance value, may request the merchant (102) to reduce the assurance value or request the merchant (102) to accept the sum of received contribution value as the assurance value for fulfilling the order request. Upon the merchant (102) reducing the assurance value, the assurance server (106) may again request the one or more entities (107A, 107B, . . . , 107N) for a contribution value.

In some non-limiting embodiments or aspects, the order request of the user (101) is declined due to at least one of the reasons including the assurance server (106) receiving the response to the request from the one or more entities (107A, 107B, . . . , 107N) after the first predefined time period and upon determining the contribution value received from the one or more entities (107A, 107B, . . . , 107N) is not equal to the assurance value. Further, the response to the request from the one or more entities (107A, 107B, . . . , 107N) after the first predefined time period is rejected by the assurance server (106).

In some non-limiting embodiments or aspects, the assurance server (106), the one or more entities (107A, 107B, . . . , 107N), and the merchant (102) may be connected via a communication network (not shown in the figure). Further, the communication network may include, for example, a direct interconnection, an e-commerce network, a peer-to-peer (P2P) network, local area network (LAN), wide area network (WAN), wireless network (e.g., using Wireless Application Protocol), the Internet, Wi-Fi®, cellular network, and the like.

In some non-limiting embodiments or aspects, the assurance server (106) re-initiates the transaction between the user (101) and a merchant (102) after the second predefined time period by cloning the transaction. The second predefined time period indicates a minimum time duration required by the assurance server (106) to wait for re-initiating the transaction. The cloning of the transaction includes copying the information of the initiated transaction into a re-initiated transaction without the need for manual entry. The transaction is sent to the issuer server (105) via the gateway (103) and the directory server (104). The assurance server (106) receives the response from the issuer server (105) including at least one of a success or a failure message.

In some non-limiting embodiments or aspects, when the re-initiated transaction is successful, the merchant (102) or the acquirer bank is credited with the transaction amount. The assurance server (106) may request the merchant (102) to transfer the total amount for distributing the total amount to the one or more entities (107A, 107B, . . . , 107N). In some non-limiting embodiments or aspects, the assurance server (106) receives from the merchant (102), or determines based on available information, the total amount associated with the transaction and distributes the contribution value from the total amount to the respective one or more entities (107A, 107B, . . . , 107N). In some non-limiting embodiments or aspects, the assurance server (106) may distribute a supplementary value based on the contribution value to each of the one or more entities (107A, 107B, . . . , 107N) from the total amount.

In some non-limiting embodiments or aspects, upon receiving the failure message, the assurance server (106) may perform at least one of initiating the transaction between the user (101) and the merchant (102) after the second predefined time period or discard the transaction after repeated trials.

In some non-limiting embodiments or aspects, the one or more entities (107A, 107B, . . . , 107N) include at least one of the following: one or more financial institutions, a bank, an insurance company, a credit union, a trust company, a mortgage loan company, a brokerage firm, an individual person, or any combination thereof.

Figure 2:
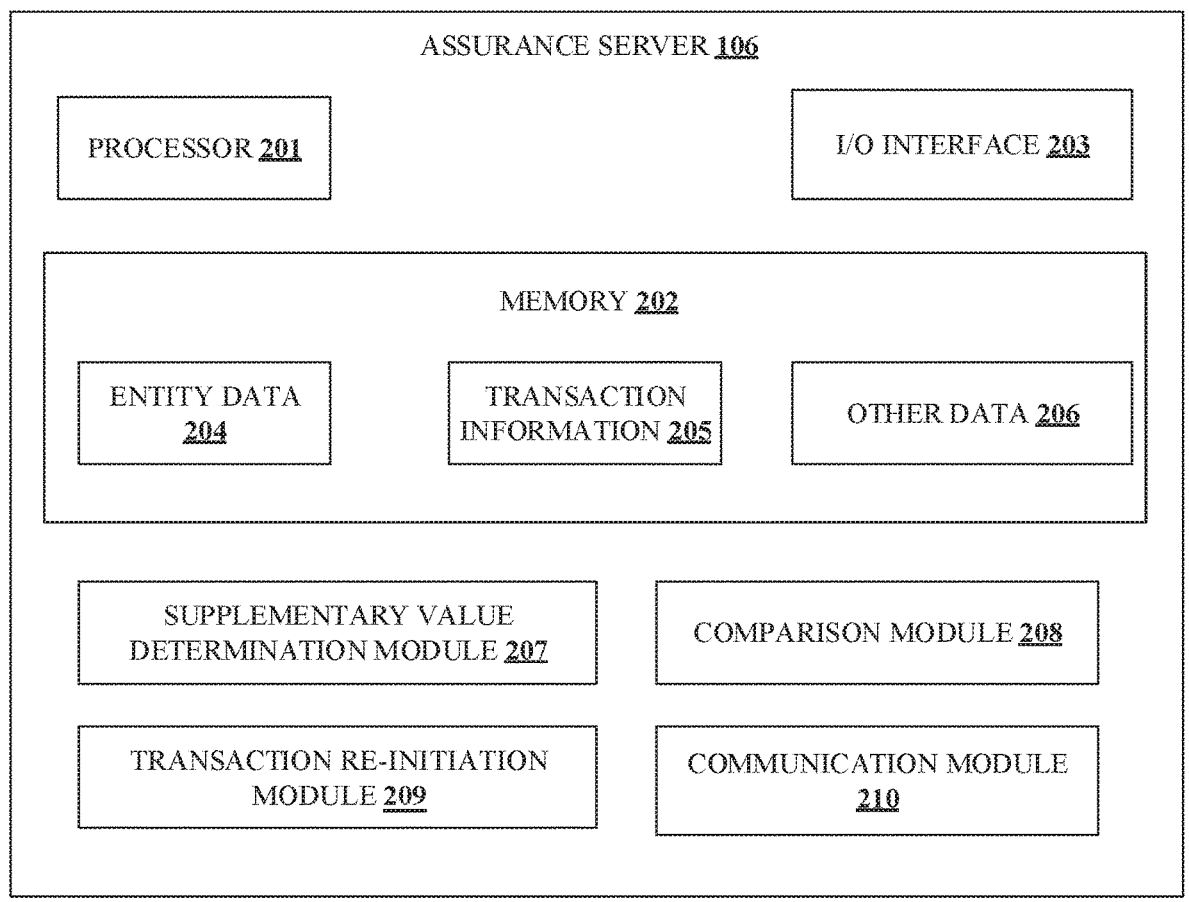
FIG. 2 shows a simplified block diagram of an assurance server for fulfilling an order request and re-initiating a transaction, in accordance with embodiments of the present disclosure.

FIG. 2 shows a simplified block diagram of an assurance server (106), in accordance with non-limiting embodiments or aspects of the present disclosure. In some non-limiting embodiments or aspects, the assurance server (106) may include at least one Central Processing Unit ("CPU" or "processor") (201) and a memory (202) storing instructions executable by the at least one processor (201). The processor (201) may comprise at least one data processor for executing program components for executing user- or system-generated requests. The memory (202) is communicatively coupled to the processor (201). The assurance server (106) further comprises an Input/Output (I/O) interface (203). The I/O interface (203) is coupled with the processor (201) through which an input signal and/or an output signal is communicated. In some non-limiting embodiments or aspects, the data stored in the memory (202) may include entity data (204), the transaction information (205), and other data (206).

In some non-limiting embodiments or aspects, the entity data (204) includes information regarding the one or more entities (107A, 107B, . . . , 107N). The one or more entities (107A, 107B, . . . , 107N) include at least one of one or more financial institutions and an individual person. The information may include one or more of a name, address, authentication details, KYC details, associated banks, and the like.

In some non-limiting embodiments or aspects, transaction information (205) may include at least one of the following: a BIN associated with a card of the user (101), expiry date of the card, a Card Verification Value (CVV), issuer server (105) bank details, password, pin number, One Time Password (OTP) details, acquirer bank details, total amount, billing address, merchant details, the Internet Protocol (IP) address associated with the transaction, or any combination thereof. For example, for a transaction initiated in India, the issuer server bank details and the acquirer bank details may include name, address, Indian Financial System Code (IFSC) code, and the like. The merchant details may include name, category code, and the like. Further, the transaction information (205) may include the details regarding the error that occurred while processing the transaction. The error that occurred while processing the transaction includes at least one of a message failure, a hardware failure, and a network failure. For example, an error "capture amount exceeded allowable limit" and the associated error code "4006" may be stored in the transaction information (205).

In some non-limiting embodiments or aspects, other data (206) may include the assurance value received from the merchant (102), the contribution value provided by each of the one or more entities (107A, 107B, . . . , 107N), the first predefined time period data for receiving the response from the one or more entities (107A, 107B, . . . , 107N), the second predefined time period data for re-initiating the transaction between the user (101) and the merchant (102).

In some non-limiting embodiments or aspects, a supplementary value determination module (207) is used to determine a supplementary value based on the contribution value provided by each of the one or more entities (107A, 107B, . . . , 107N). The contribution value provided by the one or more entities (107A, 107B, . . . , 107N) is one of partial or total of the assurance value requested by the merchant (102). For example, for an assurance value of $80, and the total amount of $100, the contribution value by the entity 1 (107A) may be $50 and the contribution value by the entity N (107N) may be $30. In an exemplary embodiment, the supplementary value for each of the one or more entities (107A, 107B, . . . , 107N) may be computed using the equation given below:

$$\frac{(\text{total amount} - \text{assurance value}) * \text{contribution value of entity } i}{\text{assurance value}} \quad (1)$$

Therefore, the supplementary value for the entity 1 (107A) is $12.5 and for the entity N (107N) is $7.5. The person skilled in the art may appreciate the use of one or more existing techniques to compute the supplementary value based on the contribution value. Further, the supplementary value may also be calculated using various other factors including, but not limited to, time taken by the one or more entities (107A, 107B, . . . , 107N) to respond to the request made by the assurance server (106), number of contributions made, and the like.

In some non-limiting embodiments or aspects, a comparison module (208) is used to sum the contribution value received from the each of the one or more entities (**107A, 107B, ..., 107N) and compare the sum of the contribution value with the assurance value received from the merchant (102). If the sum of the contribution value and the assurance value is equal, then the assurance message is sent to the merchant (102). If the sum of the contribution value is less than the assurance value, then a message indicating a failure to provide an assurance is sent to the merchant (102) and the order is cancelled.

In some non-limiting embodiments or aspects, transaction re-initiation module (209) is used to re-initiate the transaction between the user (101) and the merchant (102) after the second predefined time period. The transaction is re-initiated by inserting a value in one or more fields in a transaction message of the transaction. The one or more fields indicate a re-initiation of the transaction after the second predefined time period, where the transaction was failed due to the error that occurred while processing the transaction. Further, the one or more fields in the transaction message include at least one of a Message Type Indicator (MTI), bitmap, or data elements.

In some non-limiting embodiments or aspects, a communication module (210) is configured to receive at least one of the information regarding the transaction, the information regarding the error that occurred while processing the transaction, the assurance value, and information regarding the total amount associated with the transaction from the merchant (102). Further, the communication module (210) is configured to receive the contribution value from the one or more entities (107A, 107B, ..., 107N). The communication module (210) is configured to provide the merchant (102) an assurance message and provide information regarding the supplementary value to the one or more entities (107A, 107B, ..., 107N). Furthermore, the communication module (210) is configured to send the information associated with the transaction to the gateway (103) and receive the status of the transaction from the gateway (103).

Figure 3:
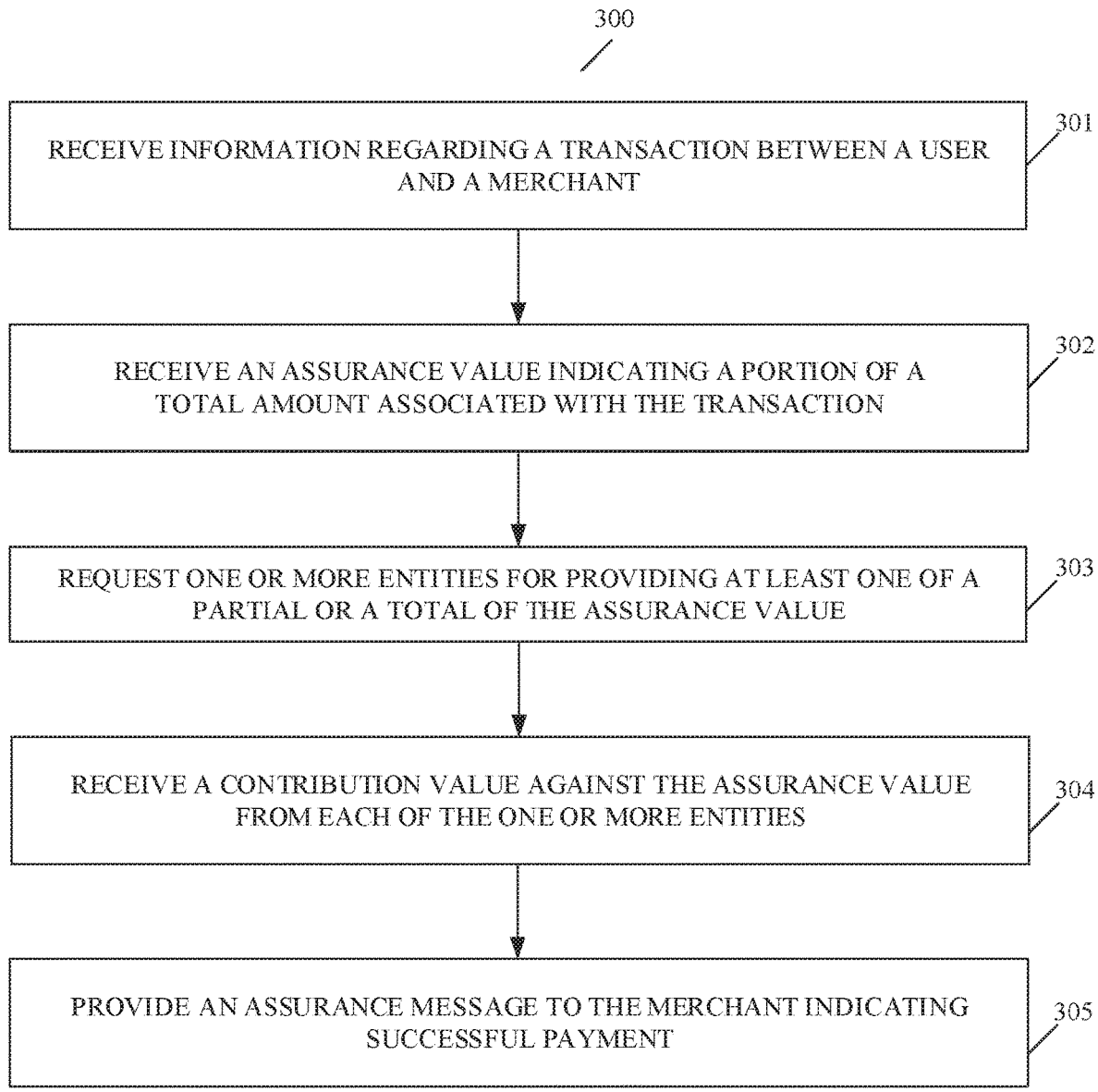
FIG. 3 shows a flow chart illustrating method steps for fulfilling an order request, in accordance with some non-limiting embodiments or aspects of the present disclosure.

FIG. 3 shows a flow chart illustrating method steps for fulfilling an order request, in accordance with some non-limiting embodiments or aspects of the present disclosure. The order in which the method 300 is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

Figure 4:
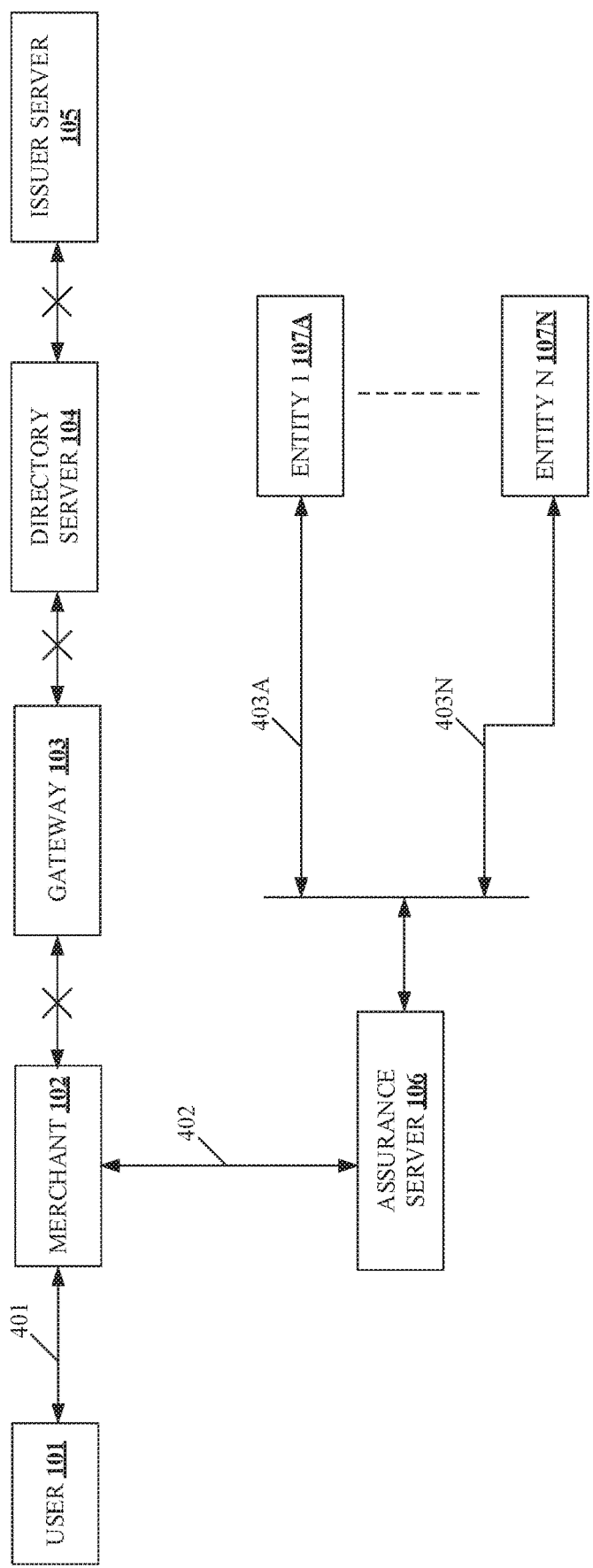
FIG. 4 shows an exemplary environment for communicating or providing an assurance message to a merchant, in accordance with some non-limiting embodiments or aspects of the present disclosure.

In some non-limiting embodiments or aspects, the user (101) may initiate a payment transaction for an order request with the merchant (102). The merchant (102) may be at least one of a store comprising a POS device connected to the merchant (102), an e-commerce application, and the like. The order request made by the user (101) may be at least one of purchasing the one or more goods, requesting one or more services, and the like. The payment transaction may be initiated using at least one of a card present transaction at a POS device, a card-on-file transaction, and the like, indicated by message flow (401), as shown in FIG. 4. The transaction is sent to the acquirer bank associated with the merchant (102) via a gateway (103) where the acquirer bank further requests the issuer server (105) for authorization and/or authentication of the transaction via the gateway (103) and the directory server (104). Further, the issuer server (105) validates the transaction by verifying at least one of the following: the card details, billing address, a Card Verification Value (CVV) number, and the like. Based on the verification the issuer server (105) approves or declines the transaction and an appropriate success or failure message may be sent to the merchant (102) via the directory server (104) and the gateway (103). The failure message may include at least one of a reason for declining the transaction and an error code. Upon receiving the failure message, the merchant (102) may request the assurance server (106) to provide an assurance to one of a partial value of the total amount or the total amount associated with the transaction.

Referring FIG. 3, at step 301, the assurance server (106) receives information regarding a transaction between a user (101) and a merchant (102), and information regarding an error while processing the transaction. The error that occurred while processing the transaction includes at least one of a message failure, a hardware failure, and a network failure, as shown in FIG. 4. The message failure may include authorization decline for the transaction message, settlement decline for the transaction message, and the like. The hardware failure may include non-working of one or more hardware components, for example, routers, network switches, servers, and the like. The network failure may include connectivity issues associated with the merchant (102), the gateway (103), the directory server (104), and the issuer server (105). For example, the response from the issuer server (105) for the transaction may not be deliverable to the directory server (104) due to network failure. In another example, the merchant (102) may receive information regarding the error indicating "Limit Exceeded" with an error code "2002".

In some non-limiting embodiments or aspects, the occurrence of the error while processing the transaction may occur for a reason including, but not limited to, the card limit was reached or insufficient funds, the total amount associated with the transaction exceeded the maximum amount allowed for a single transaction, reached a maximum number of transactions allowed in a time period, card is not allowed to accept transactions from an online source, international transactions not allowed, card is not authorized for transactions of the classification type mail order/telephone order, invalid expiry date, invalid card number, invalid billing address, and the like. The assurance server (106) may store the transaction information for re-initiating the transaction after the second predefined time period.

Referring FIG. 3, at step 302, the assurance server (106) receives an assurance value indicating a portion of a total amount or the total amount associated with the transaction from the merchant (102) for fulfilling an order request of the user (101). The merchant (102) transmits the assurance value to the assurance server (106) upon determining the error that occurred while processing the transaction, indicated by the message flow (402), as shown in FIG. 4. For example, if the total amount associated with the transaction is $500, the assurance server (106) may receive the assurance value as $450 from the merchant (102) indicating the willingness of the merchant (102) to fulfill the order request of the user (101) upon receiving an assurance or a guarantee for the assurance value. With continued reference to FIG. 3, at step 303, the assurance server (106) requests the one or more entities (107A, 107B, ..., 107N) for providing at least one of a partial or total value of the assurance value received from the merchant (102).

In some non-limiting embodiments or aspects, the assurance server (106) may share the information regarding the transaction and the information regarding the error that occurred while processing the transaction with the one or more entities (107A, 107B, ..., 107N), indicated by the message flow (403A, 403B, ..., 403N), as shown in FIG. 4. For example, the assurance server (106), upon sharing the information regarding the transaction and the error associated with the transaction, requests the one or more entities (107A, 107B, . . . , 107N) to provide an assurance for the assurance value of $450, where the total amount associated with the transaction is $500.

At step 304, in response to the request, the assurance server (106) receives a contribution value from each of the one or more entities (107A, 107B, . . . , 107N), indicated by the message flow (403A, 403B, . . . , 403N), as shown in FIG. 4, where the contribution value is one of the partial or total of the assurance value. The contribution value from each of the one or more entities (107A, 107B, . . . , 107N) is determined using a risk level obtained from one or more parameters associated with at least one of the user (101), the merchant (102), and the order request. The one or more parameters includes at least one of the following: user information, BIN, transaction log, merchant information, details of the order request, past transactions of the user (101), past transactions of the merchant (102), or any combination thereof.

In some non-limiting embodiments or aspects, each of the one or more entities (107A, 107B, . . . , 107N) may individually determine a risk level of the transaction using an Artificial Intelligence (AI) based learning algorithm based on the one or more parameters associated with at least one of the user (101), the merchant (102), information regarding the transaction, the error that occurred while processing the transaction, and the order request. Based on the determined risk level, each of the one or more entities (107A, 107B, . . . , 107N) may determine the contribution value.

In some non-limiting embodiments or aspects, the risk level determined for a transaction may be categorized as a safe transaction, a low-risk transaction, a medium-risk transaction, a high-risk transaction, and a severe-risk transaction based on a percentage of risk. For example, a risk percentage of 10% may be categorized as a safe transaction, and a risk percentage of 85% may be categorized as a high-risk transaction. Further, the one or more entities (107A, 107B, . . . , 107N) may determine the contribution value based on the determined risk level. For example, the entity 1 (107A) may contribute $20 based on the determined risk level of 14%, and the entity N (107N) may contribute $0 based on the determined risk level of 90%, and the like. For example, the assurance server (106), for the assurance value of $450 and the total amount of $500 associated with the transaction, based on the determined risk level, may receive from the entity 1 (107A) the contribution value of $100, the entity 2 (107B) the contribution value of $50, and the entity N (107N) the contribution value of $300.

In some non-limiting embodiments or aspects, the assurance server (106) may wait for the response to the request from the one or more entities (107A, 107B, . . . , 107N) for the first predefined time period. For example, the predefined time period may be set to 4 minutes from the timestamp of sending the request to the one or more entities (107A, 107B, . . . , 107N). Upon receiving the response to the request from the one or more entities (107A, 107B, . . . , 107N) after the first predefined time period, the assurance server (106) rejects the responses. Further, the assurance server (106) may reject the responses from the one or more entities (107A, 107B, . . . , 107N) upon receiving the sum of the contribution value equal to the assurance value within the first predefined time period.

Referring FIG. 3, at step 305, the assurance server (106) provides an assurance message to the merchant (102) indicating successful payment for fulfilling the order request of the user (101), upon determining a total contribution value received from the one or more entities (107A, 107B, . . . , 107N) is summing up to the assurance value.

The assurance server (106) determines the sum of the contribution value received from each of the one or more entities (107A, 107B, . . . , 107N). The total contribution value received from the one or more entities (107A, 107B, . . . , 107N) is compared with the assurance value requested by the merchant (102). When the total contribution value is equal to the assurance value, then the assurance server (106) sends an assurance message to the merchant (102), indicated by the message flow (402). The merchant (102), upon receiving the assurance message, fulfills or completes the order request of the user (101). When the total contribution value is less than the assurance value, the assurance server (106) sends a message to the merchant (102) indicating the failure to provide assurance or guarantee to the requested assurance value. Further, the merchant (102) declines the order request of the user (101). The merchant (102) may ask the user (101) to initiate new payment transaction for fulfilling the order request.

Figure 5:
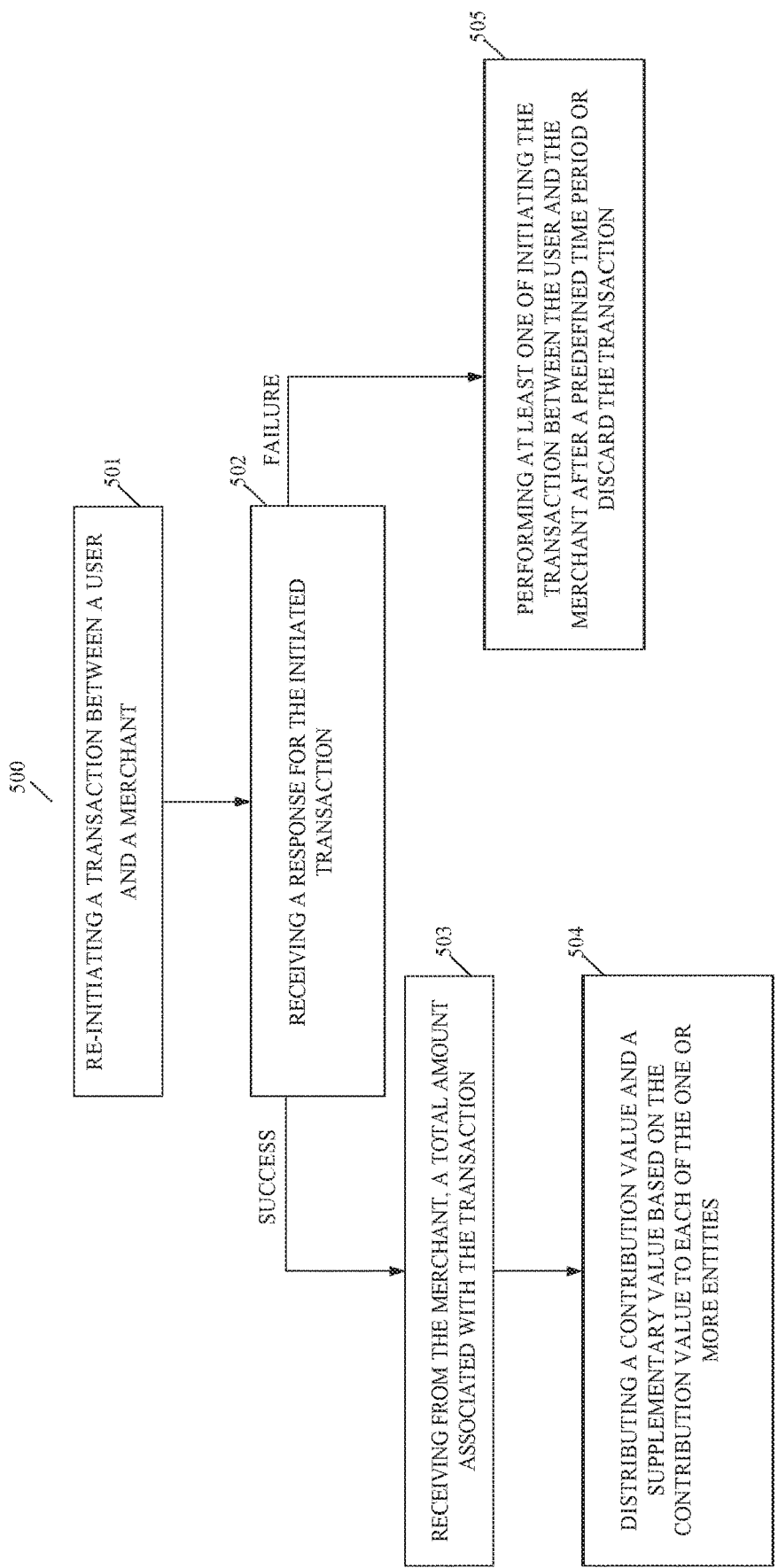
FIG. 5 shows a flow chart illustrating method steps for re-initiating a transaction, in accordance with some non-limiting embodiments or aspects of the present disclosure.

FIG. 5 shows a flow chart illustrating method steps for re-initiating a transaction between the user (101) and the merchant (102) in accordance with some non-limiting embodiments or aspects. The order in which the method 500 is described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

Figure 6:
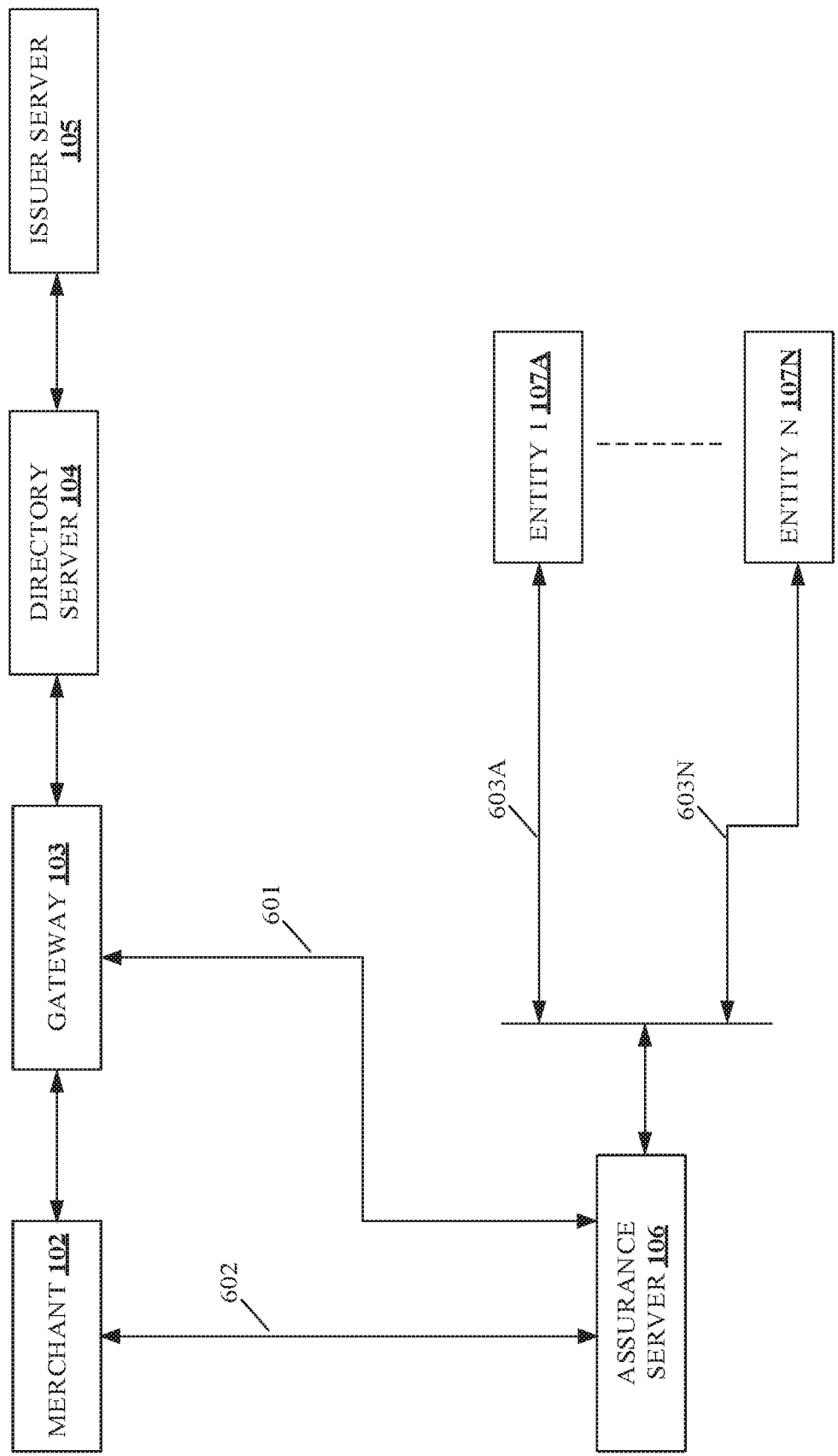
FIG. 6 shows an exemplary environment for re-initiating a failed transaction, in accordance with some non-limiting embodiments or aspects of the present disclosure.

At step 501, the assurance server (106) re-initiates the stored transaction between the user (101) and the merchant (102) after the second predefined time period via the gateway (103), indicated by a message flow (601), as shown in FIG. 6, after receiving information regarding the transaction when the error that occurred while processing the transaction and the assurance server (106) fulfilled an order request associated with the transaction. The assurance server (106) fulfilled the order request of the user (101) by determining, providing, and/or communicating an assurance or guarantee to the assurance value requested by the merchant (102).

In some non-limiting embodiments or aspects, re-initiating the transaction comprises inserting a value in one or more fields in a transaction message of the transaction, indicating a re-initiation of the transaction after the second predefined time period, where the transaction failed due to the error that occurred while processing the transaction. Further, the one or more fields in the transaction message comprises at least one of a Message Type Indicator (MTI), bitmap, or data elements. In some non-limiting embodiments or aspects, the assurance server (106) provides the re-initiated transaction to the issuer server (105) for authentication and/or authorization via the gateway (103) and the directory server (104) on behalf of the merchant (102) for completing the transaction.

At step 502, the assurance server (106) receives a response for the initiated transaction from the issuer server (105) via the directory server (104) and the gateway (103), indicated by the message flow (601), as shown in FIG. 6, where the response comprises at least one of a success or a failure message. For example, if the error that occurred while processing the transaction is "reached a maximum number of transactions allowed in a time period", re-initiating the transaction after the second predefined time period may result in the successful completion of the transaction. In another example, if the error that occurred while processing the transaction is "the total amount associated with the transaction exceeded the maximum amount allowed for a single transaction", re-initiating the transaction at a later point in time where the user (101) has requested the issuer server (105) to increase the credit limit associated with the card of the user (101) may result in the successful completion of the transaction.

At step 503, upon receiving the success message, the assurance server (106) receives, from the merchant (102), and/or determines, based on available information, a total amount associated with the transaction between the user (101) and the merchant (102), indicated by a message flow (602). In some non-limiting embodiments or aspects, the assurance server (106) receives the success message from the issuer server (105) for the initiated transaction. Further, the assurance server (106) may receive the total amount associated with the transaction from the merchant (102), upon the merchant (102) receiving the total amount from the issuer server (105) after a settlement procedure.

At step 504, the assurance server (106) distributes a contribution value and a supplementary value, indicated by a message flow (603A, 603B, . . . , 603N), as shown in FIG. 6, based on the contribution value to each of the one or more entities (107A, 107B, . . . , 107N) from the total amount, where the contribution value of the one or more entities (107A, 107B, . . . , 107N) is at least one of a partial or total of assurance value, where the assurance value is a portion of the total amount associated with the transaction.

In some non-limiting embodiments or aspects, the assurance server (106) may determine the supplementary value using the equation (1). For example, if the assurance value is $450, the total amount associated with the transaction is $500, the contribution value of the entity 1 (107A) is $100, the entity 2 (107B) is $50, and the entity N (107N) is $300. The assurance server (106) distributes to each of the one or more entities (107A, 107B, . . . , 107N) the contribution value and the determined supplementary value using the equation (1). The assurance server (106) provides to entity 1 (107A) the contribution value of $100, and the determined supplementary value of $11.11, provides to entity 2 (107B) the contribution value of $50 and the determined supplementary value of $5.55, provides to entity N (107N) the contribution value of $300 and the determined supplementary value of $33.33.

At step 505, upon receiving the failure message, the assurance server (106) may perform at least one of initiating the transaction between the user (101) and the merchant (102) after the second predefined time period or discard the transaction indicated by the message flow (601), as shown in FIG. 6. For example, if the information regarding the error is "card limit was reached" and the user (101) requested the issuer server (105) to increase the credit limit, the increased credit limit would be reflected after 30 minutes. The assurance server (106) initiating the transaction within the 30 minutes may receive the failure message but initiating the transaction after 30 minutes may successfully complete the transaction. In some non-limiting embodiments or aspects, the transaction is discarded after initiating the transaction for a predefined value and receiving the failure message. For example, the assurance server (106) discards the transaction after initiating the transaction for 10 times and receiving the failure message for each of the 10 initiations.

Thus, the assurance server (106) implements a method for fulfilling the order request of the user (101). The assurance server (106) provides an assurance or guarantee to the assurance value requested by the merchant (102) in near real time or a short duration of time, for example, 10 minutes. Further, the one or more entities (107A, 107B, . . . , 107N) providing the contribution value earn a reward of a supplementary value. The successful order fulfillment increases the number of transactions to the merchant (102) and provides better customer satisfaction.

Computer System

Figure 7:
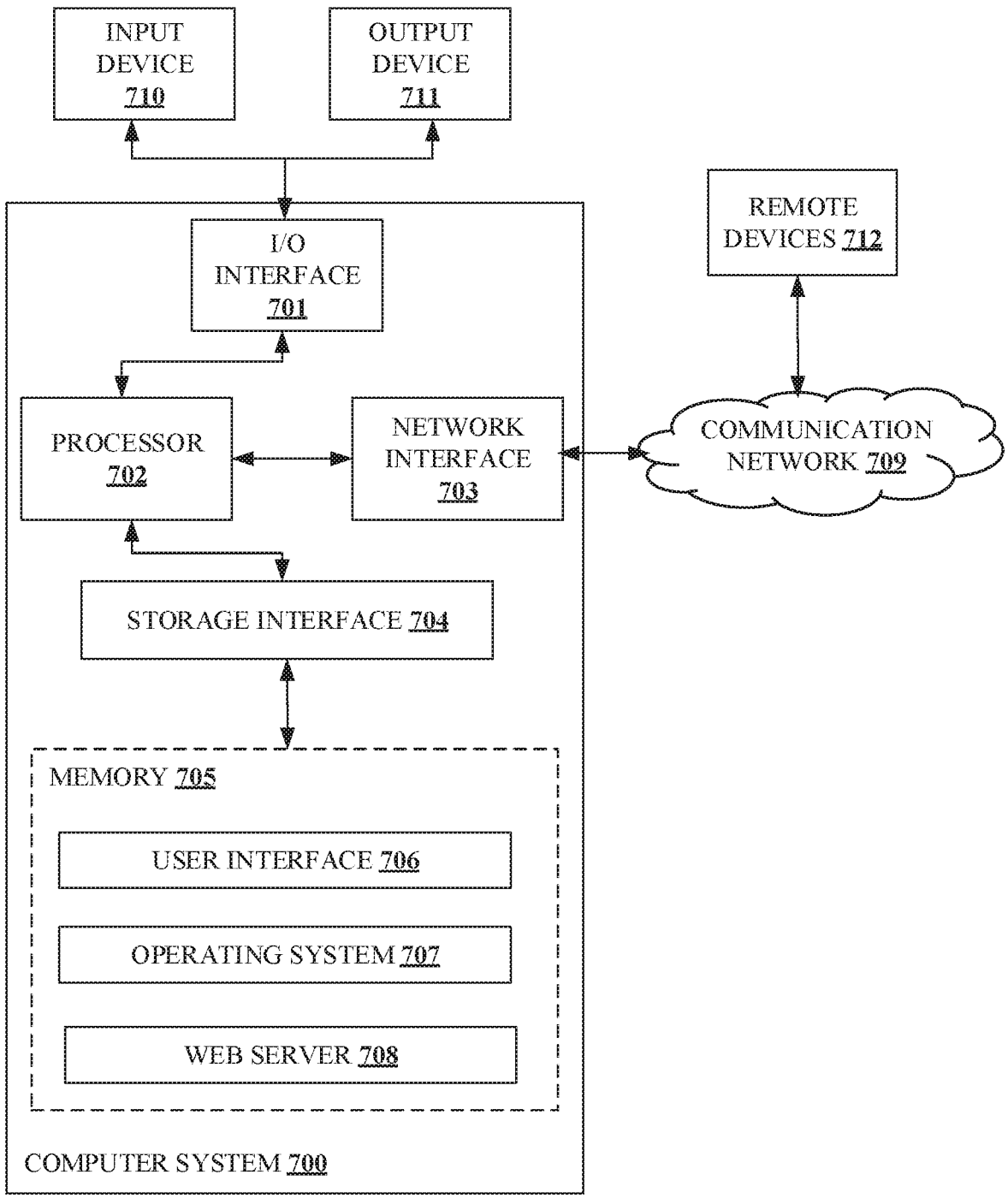
FIG. 7 shows an exemplary computer system for fulfilling an order request, in accordance with some non-limiting embodiments or aspects of the present disclosure.

FIG. 7 illustrates a block diagram of an exemplary computer system (700) for implementing embodiments consistent with the present disclosure. In some non-limiting embodiments or aspects, the computer system (700) may be used to implement the method for fulfilling the order request of the user (101). The computer system (700) may comprise a central processing unit ("CPU" or "processor") (702). The processor (702) may comprise at least one data processor for executing program components for dynamic resource allocation at run time. The processor (702) may include specialized processing units such as integrated system (bus) controllers, memory management control units, floating point units, graphics processing units, digital signal processing units, etc.

The processor (702) may be disposed in communication with one or more input/output (I/O) devices (not shown) via an I/O interface (701). The I/O interface (701) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.1 n/b/g/n/x, Bluetooth®, cellular (e.g., code-division multiple access (CDMA), high-speed packet access (HSPA+), global system for mobile communications (GSM), long-term evolution (LTE), WiMax®, or the like), etc.

Using the I/O interface (701), the computer system (700) may communicate with one or more I/O devices. For example, an input device (710) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. An output device (711) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some non-limiting embodiments or aspects, the computer system (700) is connected to the service operator through a communication network (709). The processor (702) may be disposed in communication with the communication network (709) via a network interface (703). The network interface (703) may communicate with the communication network (709). The network interface (703) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (709) may include, without limitation, a direct interconnection, an e-commerce network, a peer to peer (P2P) network, local area network (LAN), wide area network (WAN), a wireless network (e.g., using Wireless Application Protocol), the Internet, Wi-Fi®, etc. Using the network interface (703) and the communication network (709), the computer system (700) may communicate with the one or more service operators.

In some non-limiting embodiments or aspects, the processor (702) may be disposed in communication with a memory (705) (e.g., RAM, ROM, etc. not shown in FIG. 7 via a storage interface (704). The storage interface (704) may connect to the memory (705) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (705) may store a collection of program or database components, including, without limitation, a user interface (706), an operating system (707), a web server (708), etc. In some non-limiting embodiments or aspects, computer system (700) may store user/application data, such as the data, variables, records, etc. as described in this disclosure. Such databases may be implemented as fault-tolerant, relational, scalable, secure databases such as Oracle or Sybase.

The operating system (707) may facilitate resource management and operation of the computer system (700). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE® ANDROID®, BLACKBERRY® OS, or the like.

In some non-limiting embodiments or aspects, the computer system (700) may implement a web browser (not shown in the figure) stored program component. The web browser (not shown in the figure) may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as AJAX, DHTML, ADOBE® FLASH®, JAVASCRIPT®, JAVA®, Application Programming Interfaces (APIs), etc. In some non-limiting embodiments or aspects, the computer system (700) may implement a mail server (not shown in the figure) stored program component. The mail server may be an Internet mail server such as Microsoft® Exchange®, or the like. The mail server (not shown in the figure) may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some non-limiting embodiments or aspects, the computer system (700) may implement a mail client (not shown in the figure) stored program component. The mail client (not shown in the figure) may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

In some non-limiting embodiments or aspects, computer system (700) may receive at least one of the assurance value, transaction information (205), and the contribution value from a remote device (712) via a communication network (709).

The terms "an embodiment", "embodiment", "embodiments", "the embodiment", "the embodiments", "one or more embodiments", "some non-limiting embodiments or aspects", and "one embodiment" mean "one or more (but not all) embodiments of the disclosure(s)" unless expressly specified otherwise.

A description of an embodiment with several components in communication with each other does not imply that all such components are required. On the contrary, a variety of optional components is described to illustrate the wide variety of possible embodiments of the disclosure.

The terms "including", "comprising", "having", and variations thereof mean "including but not limited to" unless expressly specified otherwise. The enumerated listing of items does not imply that any or all of the items are mutually exclusive unless expressly specified otherwise. The terms "a", "an", and "the" mean "one or more" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The illustrated operations of FIG. 3 and FIG. 5 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
   receiving, with at least one processor of an assurance server arranged in a payment processing network, information regarding a transaction between a user and a merchant, and information regarding an error that occurred while processing the transaction, the error comprising at least one of the following: a message failure, a hardware failure, a network failure, or any combination thereof;
   receiving, with the at least one processor from the merchant, an assurance value indicating a portion of a total amount associated with the transaction from the merchant for fulfilling an order request of the user, wherein the merchant communicates the assurance value to the assurance server upon learning about the error that occurred while processing the transaction;
   requesting, with the at least one processor, one or more entities for providing at least one of a partial or total of the assurance value received from the merchant;
   in response to requesting the one or more entities for providing at least one of the partial or total of the assurance value received from the merchant, receiving, with the at least one processor, a contribution value from each of the one or more entities, wherein the contribution value is one of the partial or total of the assurance value;
   in response to determining the contribution value received from the one or more entities is summing up to the assurance value, communicating, with the at least one processor, an assurance message to the merchant indicating successful payment for fulfilling the order request of the user; and
   re-initiating, with the at least one processor, the transaction by cloning the transaction and sending the transaction to an issuer server in the payment processing network.

2. The method of claim 1, wherein the one or more entities comprises at least one of a financial institution and an individual person.

3. The method of claim 1, wherein the response to the request from the one or more entities is received within a first predefined time period.

4. The method of claim 1, wherein the response to the request from the one or more entities after a first predefined time period is rejected.

5. The method of claim 1, wherein the order request of the user is declined upon determining that the contribution value received from the one or more entities is not equal to the assurance value.

6. The method of claim 1, wherein the at least one processor, the merchant, and the one or more entities are connected via a communication network.

7. The method of claim 1, wherein the contribution value from each of the one or more entities is determined using a risk level obtained from one or more parameters associated with at least one of the following: the user, the merchant, the order request, or any combination thereof.

8. The method of claim 7, wherein the one or more parameters comprises at least one of the following: user information, a Bank Identification Number (BIN), transaction log information, merchant information, details of the order request, past transactions of the user, past transactions of the merchant, or any combination thereof.

9. An assurance server arranged in a payment processing network, comprising:
   at least one processor; and
   a memory communicatively coupled to the at least one processor, wherein the memory stores processor instructions, which, on execution, causes the at least one processor to:
      receive information regarding a transaction between a user and a merchant, and information regarding an error that occurred while processing the transaction, the error comprising at least one of the following: a message failure, a hardware failure, a network failure, or any combination thereof;
      receive, from the merchant, an assurance value indicating a portion of a total amount associated with the transaction from the merchant for fulfilling an order request of the user, wherein the merchant communicates the assurance value to the assurance server upon learning about the error that occurred while processing the transaction;
      request one or more entities for providing at least one of a partial or total of the assurance value received from the merchant;
      in response to the request, receive a contribution value from each of the one or more entities, wherein the contribution value is one of the partial or total of the assurance value;
      in response to upon determining a total contribution value received from the one or more entities is summing up to the assurance value, communicate an assurance message to the merchant indicating successful payment for fulfilling the order request of the user; and
      re-initiate the transaction by cloning the transaction and sending the transaction to an issuer server in the payment processing network.

10. The assurance server of claim 9, wherein the one or more entities comprises at least one of a financial institution and an individual person.

11. The assurance server of claim 9, wherein the at least one processor is configured to receive the response to the request from the one or more entities within a first predefined time period.

12. The assurance server of claim 9, wherein the at least one processor is configured to reject the response to the request from the one or more entities after a first predefined time period.

13. The assurance server of claim 9, wherein the at least one processor is configured to send a message to the merchant indicating the contribution value received from the one or more entities is not equal to the assurance value to cause the merchant to decline the order request of the user.

14. The assurance server of claim 9, wherein the contribution value from each of the one or more entities is determined using a risk level obtained from one or more parameters associated with at least one of the following: the user, the merchant, the order request, or any combination thereof.

* * * * *